(12) United States Patent
Sone (10) Patent No.: US 10,592,204 B2
(45) Date of Patent: Mar. 17, 2020

(54) USER INTERFACE DEVICE AND METHOD, AND SOUND-ENABLED OPERATION SYSTEM

(71) Applicant: YAMAHA CORPORATION, Hamamatsu-shi (JP)

(72) Inventor: Takuro Sone, Hamamatsu (JP)

(73) Assignee: YAMAHA CORPORATION, Hamamatsu-Shi (JP)

( * ) Notice: Subject to any disclaimer, the term of this patent is extended or adjusted under 35 U.S.C. 154(b) by 107 days.

(21) Appl. No.: 15/902,370

(22) Filed: Feb. 22, 2018

(65) Prior Publication Data

US 2018/0275959 A1    Sep. 27, 2018

Related U.S. Application Data

(63) Continuation of application No. PCT/JP2017/112170, filed on Mar. 24, 2017.

(51) Int. Cl.
*G10L 15/22*  (2006.01)
*G06F 3/16*  (2006.01)
(Continued)

(52) U.S. Cl.
CPC .............. *G06F 3/167* (2013.01); *G10L 13/04* (2013.01); *G10L 15/08* (2013.01); *G10L 15/22* (2013.01);
(Continued)

(58) Field of Classification Search
CPC ....... G10L 15/22; G10L 13/04; G10L 15/265; G10L 15/30; G10L 15/32; G10L 17/24; G10L 21/16; G10L 25/48; G10L 25/51; G10L 25/84; G10L 25/90; G10L 2015/0631; G10L 2015/223; G06F 16/632;
(Continued)

(56) References Cited

U.S. PATENT DOCUMENTS 5,042,063 A * 8/1991 Sakanishi ............. H04M 1/271
                                                            379/354
5,229,763 A * 7/1993 Nakamaru ............. G08C 19/28
                                                            340/12.28
(Continued)

FOREIGN PATENT DOCUMENTS

JP    S57024193 A    2/1982
JP    H103262398 A    11/1991
(Continued)

OTHER PUBLICATIONS

International Search Report issued in International Application No. PCT/JP2017/012170 dated Jun. 13, 2017. Partial English translation provided.

(Continued)

*Primary Examiner* — Vijay B Chawan
(74) *Attorney, Agent, or Firm* — Rossi, Kimms & McDowell LLP (57) ABSTRACT

A user interface device includes a sound input unit which acquires an inputted sound, a sound recognition unit which acquires a result of predetermined recognition processing on the acquired sound, a speech generation unit which generates a speech corresponding to the result of the recognition processing, and a speech output unit which outputs the speech generated by the speech generation unit.

17 Claims, 8 Drawing Sheets

(51) Int. Cl.
*G10L 13/04* (2013.01)
*G10L 15/08* (2006.01)

(52) U.S. Cl.
CPC .. *G10L 2015/088* (2013.01); *G10L 2015/223* (2013.01); *G10L 2015/225* (2013.01)

(58) Field of Classification Search
CPC ...... G06F 16/634; G06F 16/68; G06F 16/683; G06F 16/685; G06F 3/0236; G06F 3/0237; G06F 3/04817; G06F 3/04886; G06F 3/167
USPC ............ 704/270.1, 270, 275, 251, 231, 236; 84/609
See application file for complete search history.

(56) References Cited

U.S. PATENT DOCUMENTS

| | | | |
|---|---|---|---|
| 9,489,946 B2* | 11/2016 | Ueno | G10L 15/26 |
| 9,711,136 B2* | 7/2017 | Seto | G10L 15/32 |
| 2003/0033150 A1* | 2/2003 | Balan | G01S 5/22 |
| | | | 704/275 |
| 2007/0131094 A1* | 6/2007 | Kemp | G10H 1/0008 |
| | | | 84/609 |
| 2007/0254728 A1* | 11/2007 | Moallemi | H04B 1/7163 |
| | | | 455/574 |
| 2007/0257827 A1 | 11/2007 | Lee et al. | |
| 2007/0279237 A1 | 12/2007 | Julian et al. | |
| 2007/0281721 A1* | 12/2007 | Lee | H04W 8/005 |
| | | | 455/502 |
| 2008/0043824 A1 | 2/2008 | Jacobs et al. | |
| 2008/0045161 A1 | 2/2008 | Lee et al. | |
| 2008/0167872 A1* | 7/2008 | Okimoto | G10L 15/22 |
| | | | 704/251 |
| 2012/0163630 A1 | 6/2012 | Yano et al. | |
| 2013/0201316 A1* | 8/2013 | Binder | H04L 67/12 |
| | | | 348/77 |
| 2014/0222436 A1* | 8/2014 | Binder | G06F 3/167 |
| | | | 704/275 |
| 2016/0232329 A1 | 8/2016 | Xu et al. | |
| 2017/0078400 A1* | 3/2017 | Binder | H04L 67/12 |
| 2018/0130459 A1* | 5/2018 | Paradiso | G10L 13/04 |

FOREIGN PATENT DOCUMENTS

| | | |
|---|---|---|
| JP | H08265440 A | 10/1996 |
| JP | H09293083 A | 11/1997 |
| JP | H10301567 A | 11/1998 |
| JP | H11095788 A | 4/1999 |
| JP | H11265190 A | 9/1999 |
| JP | H11296182 A | 10/1999 |
| JP | 2001324987 A | 11/2001 |
| JP | 2004094424 A | 3/2004 |
| JP | 2007183921 A | 7/2007 |
| JP | 2009103893 A | 5/2009 |
| JP | 2009534944 A | 9/2009 |
| JP | 2012141449 A | 7/2012 |
| JP | 2015146055 A | 8/2015 |
| JP | 2016536659 A | 11/2016 |

OTHER PUBLICATIONS

Written Opinion issued in International Application No. PCT/JP2017/012170 dated Jun. 13, 2017 Partial English translation provided.

* cited by examiner

| INPUT PATTERN | | OUTPUT PATTERN |
|---|---|---|
| Si + V | —— P1 ——→ | Vi + V |
| Vi + S | —— P2 ——→ | |
| Si + S | —— P3 ——→ | Vi + Vs |
| S | —— P4 ——→ | |
| S + V | —— P5 ——→ | Vi + Vs + V |
| Si + V + S | —— P6 ——→ | |

USER INTERFACE DEVICE AND METHOD, AND SOUND-ENABLED OPERATION SYSTEM

CROSS-REFERENCE TO RELATED APPLICATION

The present application is continuation of International Application No. PCT/JP2017/012170 filed on Mar. 24, 2017. The contents of the application are hereby incorporated by reference into this application.

BACKGROUND OF THE INVENTION

1. Field of the Invention

The present invention relates to a user interface device and method, and a sound-enabled operation system, and particularly to a user interface using a speech recognition system.

2. Description of the Related Art

Recently, with increasing use of speech recognition systems provided on a network, measures to enable operation via speech of various electronic devices as well as smartphones and computers, using such speech recognition systems, have been developed.

SUMMARY OF THE INVENTION

Normally, when operating various electronic devices via speech using a speech recognition system, a user needs to speak a fixed trigger word called wake word and subsequently speak specific content of an instruction. For example, with a speech recognition system made by Amazon, USA, a user needs to speak a trigger word "Alexa" and subsequently speak words forming the content of a command, such as a launch phrase, skill name or utterance, in order. However, the user may find it troublesome to specifically speak such fixed trigger word and command content.

In view of the foregoing problem, an object of the invention is to provide a user interface device and method based on a simpler sound, and a sound-enabled operation system.

To solve the foregoing problem, a user interface device according to the invention includes: a sound input unit which acquires an inputted sound; a sound recognition unit which acquires a result of predetermined recognition processing on the acquired sound; a speech generation unit which generates a speech corresponding to the result of the recognition processing; and a speech output unit which outputs the speech generated by the speech generation unit.

A user interface method according to the invention includes: acquiring an inputted sound; acquiring a result of predetermined recognition processing on the acquired sound; generating a speech that is a recognition target of a recognition system, corresponding to the result of the recognition processing; and outputting the generated speech.

A sound-enabled operation system according to the invention includes: a unit which acquires an inputted sound; a unit which acquires a result of predetermined recognition processing on the acquired sound; a unit which generates a speech corresponding to the result of the recognition processing; a unit which outputs the generated speech; and a unit which controls a device according to a result of recognition of the outputted sound by a speech recognition system.

DETAILED DESCRIPTION OF THE INVENTION

Hereinafter, embodiments of the invention will be described in detail, referring to the drawings.

In this description, the term "speech" means a sound that is a recognition target of a speech recognition system and includes a speech sound generated through a human vocal organ or through a speaker. Meanwhile, the term "sound" means any sound acquired through sound collection by a microphone or through input of an electrical signal, and includes a sound that is a recognition target of a speech recognition system and sounds other than the recognition target. In the description below, elements that have already been described are denoted by the same reference numbers and detailed description of these elements is omitted, where appropriate.

Figure 1:
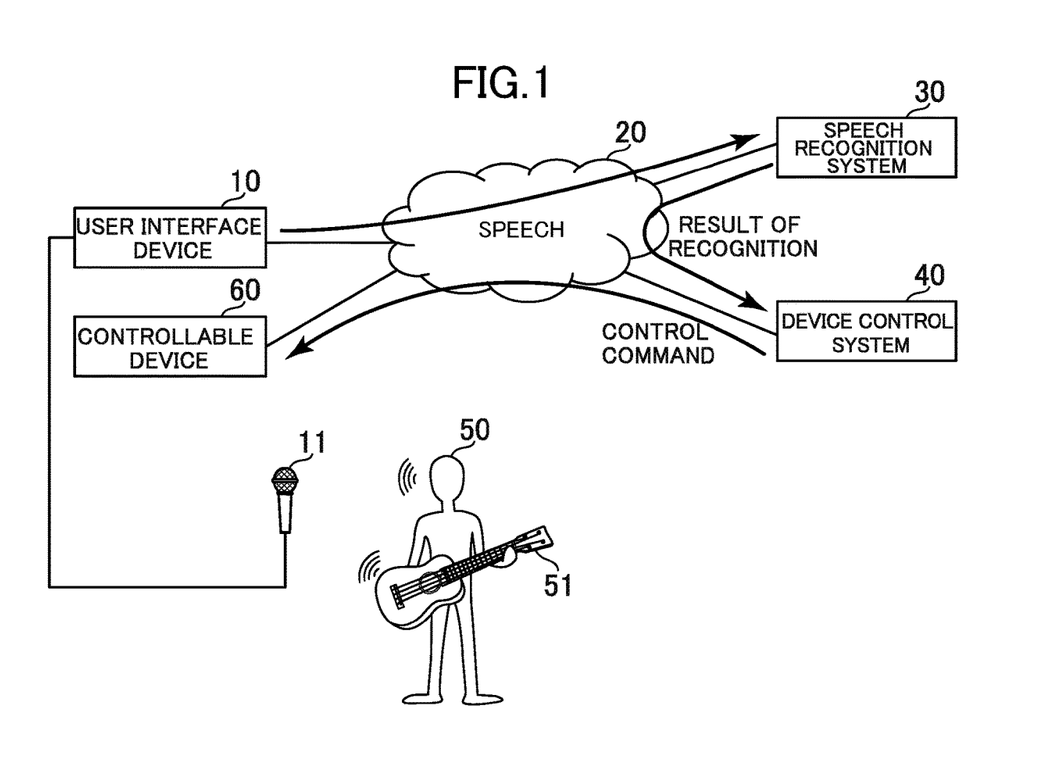
FIG. 1 shows the overall configuration of a first sound-enabled operation system including a user interface device according to a first embodiment of the invention.

FIG. 1 shows the overall configuration of a first sound-enabled operation system. The first sound-enabled operation system shown in FIG. 1 includes a user interface device 10 according to a first embodiment of the invention, a speech recognition system 30, a device control system 40, and a controllable device 60. Each of the user interface device 10, the speech recognition system 30, the device control system 40, and the controllable device 60 is connected to a communication network 20 such as the internet. This sound-enabled operation system enables operation of the controllable device 60 from the user interface device 10, not only via speech but also via a sound of a musical instrument 51 playing or the like.

The controllable device 60 may be any device that can be connected to the communication network 20, such as an electronic musical instrument, audio device, video device, smartphone, personal computer, air-conditioning device, or water heater. The user interface device 10 is an input device which operates the controllable device 60 via speech or other sounds. The user interface device 10 may be integrated with the controllable device 60. The user interface device 10 may also be configured as a sound generating device, such as an electronic musical instrument, which generates a sound when operated by a user.

Each of the speech recognition system 30 and the device control system 40 may include one or more computers and may be implemented, for example, using cloud computing.

The speech recognition system 30 receives a speech (speech data) from the user interface device 10 via the communication network 20 and then performs known speech recognition processing on that speech. The result of the recognition is outputted as data representing the content of the speech (for example, a text describing the content of the utterance). Particularly if the result of the recognition includes content of control on the controllable device 60, the result of the recognition by the speech recognition system 30 is transmitted to the device control system 40 via the communication network 20.

The device control system 40 receives the result of the recognition by the speech recognition system 30 via the communication network 20, and then converts the result of the recognition into a control command for the controllable device 60 and transmits the control command to the controllable device 60 via the communication network 20. If the controllable device 60 is an electronic musical instrument, the control command is a command to start automatic playing, a command to stop automatic playing, or the like. The command to start automatic playing may include the designation of a piece to be played. If the controllable device 60 is an audio device, the control command is a command to play back a piece of music, a command to stop playing back a piece of music, or the like. The command to play back a piece of music may include the designation of a piece to be played back. If the controllable device 60 is a video device, the control command is a command to start outputting a video, a command to stop outputting a video, or the like. The command to start outputting a video may include the designation of a video to be outputted.

Here, the case where the controllable device 60 is an audio device will be described. In this sound-enabled operation system, for example, if a user 50 utters "XXX, play back YYY," in front a microphone 11 provided for the user interface device 10, the speech is transmitted to the speech recognition system 30. Here, "XXX" is a trigger word (for example, "ALEX") and "YYY" is the title of a piece of music (for example, "Yesterday by the Beatles". The part of the utterance following "YYY" is referred to as a "command phrase" in the description below.

The speech recognition system 30 performs recognition processing on the received speech and transmits the result of the recognition (a text showing the content of the utterance) to the device control system 40. The device control system 40 converts the result of the recognition into a control command for the controllable device 60 and transmits the control command to the controllable device 60. The controllable device 60 starts playing back the piece of music "YYY" in response to the control command. For example, the music data of the piece of music "YYY" saved in advance in the controllable device 60 may be played back and outputted. Alternatively, the music data of the piece of music "YYY" may be received from the communication network 20 and then played back and outputted.

In the first sound-enabled operation system, even if the user 50 does not speak a trigger word aloud in this manner, it is possible to operate the controllable device 60 from the user interface device 10 by outputting a predetermined sound (hereinafter referred to as "trigger sound") with the musical instrument 51 such as guitar or piano. For example, if the user plays a predetermined chord or melody with the musical instrument 51 in front of the microphone 11 and the user 50 utters a command phrase "Play back YYY" in front of the microphone 11 at a timing before or after the chord or melody or at a timing overlapping the chord or melody, the user interface device 10 automatically fills a space immediately before the command phrase with the content of utterance of the trigger word "XXX" and transmits a speech "XXX, play back YYY" to the speech recognition system 30. This causes the controllable device 60 to start playing back the piece of music "YYY", as in the case where the user 50 him/herself utters "XXX, play back YYY".

Figure 2:
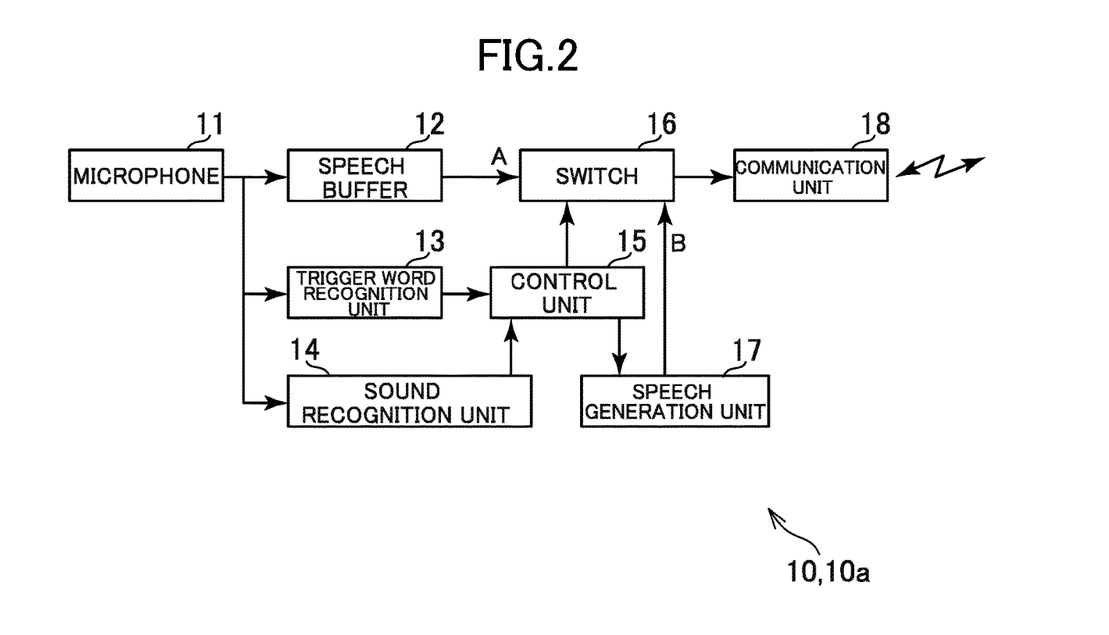
FIG. 2 shows the configuration of the user interface device according to the first embodiment of the invention.

FIG. 2 shows the configuration of the user interface device 10, based on the operation input using the microphone 11. As shown in FIG. 2, the user interface device 10 includes the microphone 11, a speech buffer 12, a trigger word recognition unit 13, a sound recognition unit 14, a control unit 15, a switch 16, a speech generation unit 17, and a communication unit 18. The user interface device 10 is mainly made up of, for example, a computer and control software.

The microphone 11 collects a voice of the user 50 or a sound of the musical instrument 51 and converts the voice or sound into an electrical signal. The speech buffer 12 is a memory for recording data of a sound for the most recent predetermined time, collected by the microphone 11. The trigger word recognition unit 13 is configured to monitor the sound collected by the microphone 11 and to determine whether a predetermined trigger word is collected or not. If the trigger word is collected, the trigger word recognition unit 13 immediately notifies the control unit 15 to that effect.

The sound recognition unit 14 performs predetermined recognition processing on the sound collected by the microphone 11. This recognition processing may be various kinds of recognition processing, as described later. However, it is assumed here, for example, that the processing is to determine whether a trigger sound such as a predetermined chord or melody is collected by the microphone 11 or not. In this processing, for example, the degree of similarity between the feature quantity of the sound collected by the microphone 11 and the feature quantity of the trigger sound is calculated, and whether the degree of similarity is equal to or higher than a predetermined value, or not, is determined. If the sound recognition unit 14 determines that the trigger sound is collected by the microphone 11, the sound recognition unit 14 immediately notifies the control unit 15 to that effect.

In the switch 16, the speech buffer 12 and the speech generation unit 17 are connected to its input side and the communication unit 18 is connected to its output side. The switch 16 switches whether to use a speech stored in the speech buffer 12 or a speech generated by the speech generation unit 17, as input data, in response to an instruction from the control unit 15.

The speech generation unit 17 is configured to synthesize a speech corresponding to the result of the recognition by the sound recognition unit 14 and output the synthesized speech to the switch 16, in response to an instruction from the control unit 15. Various speech synthesis techniques can be used to synthesize a speech. If types of speeches to be outputted are finite, the finite speeches may be stored in advance and selectively read out. Here, the speech generation unit 17 outputs a speech of a trigger word that is stored in advance (for example, "ALEX"), to the switch 16 in response to an instruction from the control unit 15. The communication unit 18 outputs the speech outputted from the switch 16, to outside. Here, the communication unit 18 streams the speech to the speech recognition system 30. Also, instead of using the communication unit 18, a speaker may be provided to emit the speech outputted from the switch 16. Then, this speech may be collected by another device and transmitted to the speech recognition system 30.

If the trigger word recognition unit 13 determines that a trigger word is collected by the microphone 11, the control unit 15 turns the switch 16 toward the speech buffer 12 (A in the illustration) and causes the communication unit 18 to transmit a speech beginning with the trigger word to the speech recognition system 30. The control unit 15 stops the transmission of the speech to the speech recognition system 30 if a predetermined end condition is satisfied, for example, if a predetermined limit time has passed or if a silent state has continued for a predetermined time. Subsequently, the controllable device 60 receives a control command from the device control system 40 and carries out an operation corresponding to the control command, as described above.

Figure 3:
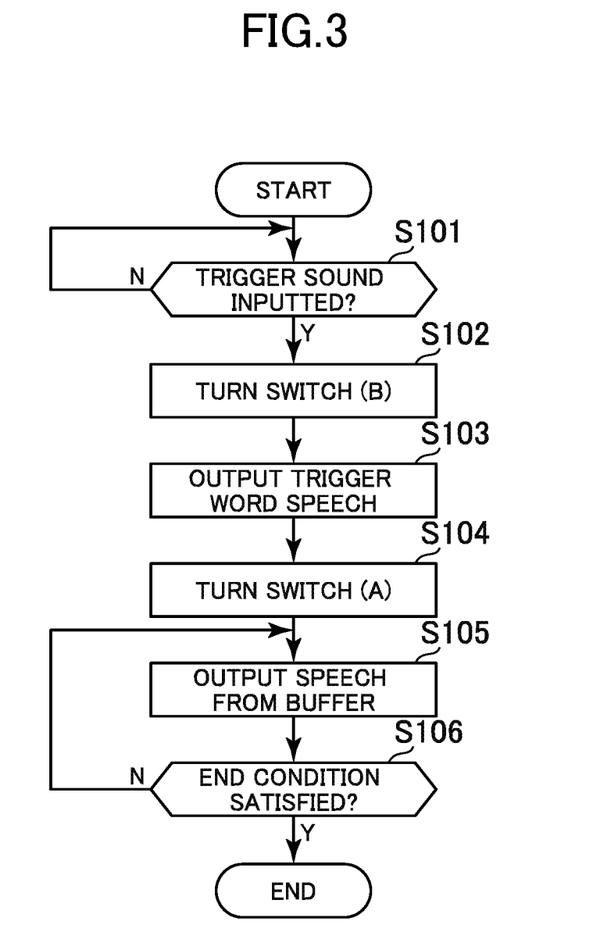
FIG. 3 is a flowchart showing the operation of the user interface device according to the first embodiment of the invention.

If the sound recognition unit 14 determines that a trigger sound is collected by the microphone 11, the control unit 15 executes the processing shown in FIG. 3. That is, if the sound recognition unit 14 determines that a trigger sound is collected by the microphone 11 (S101), the control unit 15 turns the switch 16 toward the speech generation unit 17 (B in the illustration) (S102) and causes the communication unit 18 to transmit the speech of the trigger word outputted from the speech generation unit 17, to the speech recognition system 30 (S103). After the end of the speech of the trigger word, the control unit 15 turns the switch 16 toward the speech buffer 12 (A in the illustration) (S104) and causes the communication unit 18 to transmit the speech stored in the speech buffer 12 to the speech recognition system 30 (S105). Then, if a predetermined end condition is satisfied, for example, if a predetermined limit time has passed or if a silent state has continued for a predetermined time (S106), the control unit 15 stops the transmission of the speech to the speech recognition system 30. The series of speeches is transmitted to the speech recognition system 30 in a single streaming session. Subsequently, the controllable device 60 receives a control command from the device control system 40 and carries out an operation corresponding to the control command, as described above.

In the processing shown in FIG. 3, it is assumed that the user 50 generates a trigger sound with the musical instrument 51 and subsequently utters a command phrase. However, the user may utter a command phrase before the trigger sound or overlapping the trigger sound, as described above. In this case, the sound recognition unit 14 recognizes a sound collection period of the trigger sound from the musical instrument 51 and an utterance period by the user 50. The utterance period by the user 50 can be, for example, a period when a sound in the frequency range of the voice of the user 50 is collected. In the processing of S105, the control unit 15 selects an utterance period that is the closest to the sound collection period of the trigger sound from the musical instrument 51, of the speeches stored in the speech buffer 12, and transmits the speech from the beginning of the selected utterance period, to the speech recognition system 30.

With the sound-enabled operation system described above, even if the user 50 does not speak a trigger word aloud, it is possible to operate the controllable device 60 from the user interface device 10 by generating a predetermined trigger sound with the musical instrument 51 such as guitar or piano. The trigger sound is not limited to the sound of the musical instrument 51. Various sounds that are different from the trigger word may be used. Various sounds such as a singing voice or humming of the user 50, a knock on the desk, or a tap on the floor can be employed as the trigger sound.

Figure 4:
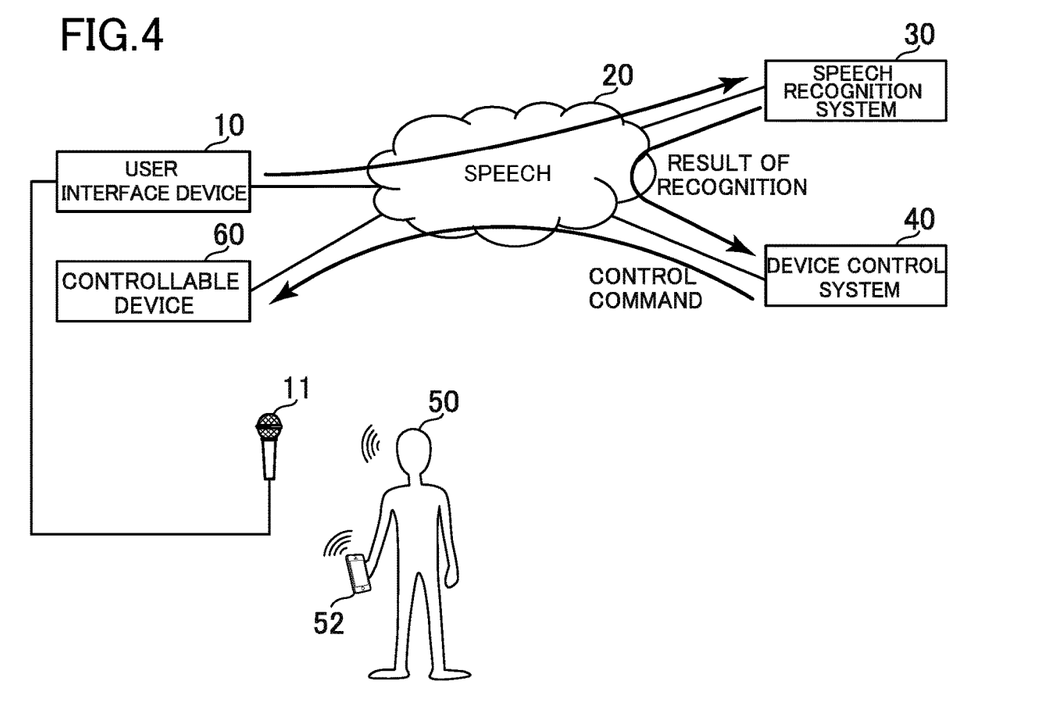
FIG. 4 shows a modification example of the first sound-enabled operation system.

The trigger sound may also be an electronically outputted sound from another sound emitting device. For example, a chime or the like may be outputted by another sound emitting device and used as the trigger sound. The trigger sound may also be an inaudible sound. As shown in FIG. 4, the user 50 may operate a mobile device to output a predetermined inaudible sound, and the sound recognition unit 14 of the user interface device 10 may recognize this sound as the trigger sound. Also, an inaudible sound formed by encoding predetermined data may be outputted as the trigger sound from the mobile device 52. In this case, the sound recognition unit 14 of the user interface device 10 may decode a sound collected by the microphone 11, and may determine that the trigger sound is collected if the predetermined data is acquired. Employing an inaudible sound as the trigger sound is advantageous in that, even if the trigger sound is emitted overlapping a command phrase and transmitted to the speech recognition system 30 in this manner, the possibility of erroneous recognition by the speech recognition system 30 of the content of the command phrase is low.

Figure 5:
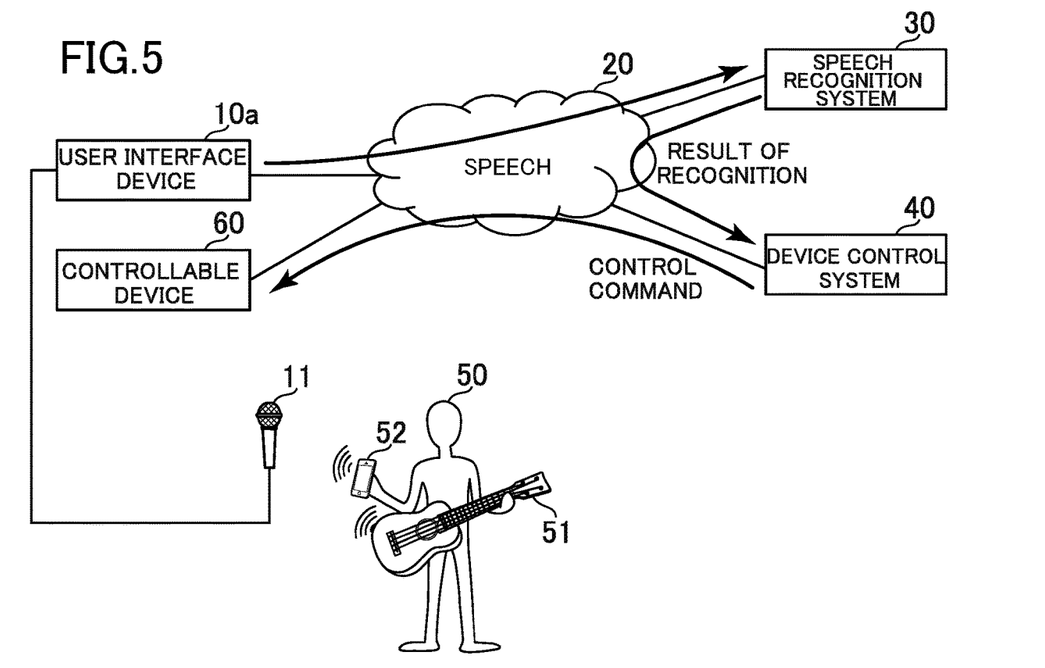
FIG. 5 shows the overall configuration of a second sound-enabled operation system including a user interface device according to a second embodiment of the invention.

Next, FIG. 5 shows the overall configuration of a second sound-enabled operation system. The second sound-enabled operation system is configured not only to replace a trigger word with a trigger sound but also to replace a command phrase with a command sound such as a sound of the musical instrument 51 playing. As an example, in the second sound-enabled operation system, the user 50 operates the mobile device 52 to output an inaudible sound that is a trigger sound in front of the microphone 11 of a user interface device 10a and plays a part of a piece of music with the musical instrument 51 at a timing before or after the output period of the trigger sound or at a timing overlapping the output period. This enables the controllable device 60 to play back the piece of music. That is, in the second sound-enabled operation system, the music sound generated by playing the musical instrument 51 is recognized by the user interface device 10a as a command sound.

The user interface device 10a according to the second embodiment of the invention has the configuration shown in FIG. 2, described already. However, particularly the functions and operations of the sound recognition unit 14, the control unit 15, and the speech generation unit 17 are different from those in the user interface device 10. That is, the sound recognition unit 14 of the user interface device 10a not only determines whether a sound collected by the microphone 11 is a trigger sound or not, but also performs recognition processing on the sound collected by the microphone 11 and specifies a piece of music corresponding to the acquired sound. For example, the sound recognition unit 14 calculates the feature quantity of the acquired sound (information representing various features such as chord pattern, melody, rhythm, and acoustic pattern). Meanwhile, a database is prepared in advance in which each of a number of pieces of music is stored in association with the feature quantity of the piece of music. The sound recognition unit 14 specifies a piece of music having a feature quantity similar to the calculated feature quantity, from the database. The database may be stored inside the user interface device 10a or may be stored in another computer that can be accessed via the communication network 20. If the sound recognition unit 14 can acquire the final result of the recognition processing, a part or the entirety of the recognition processing by the sound recognition unit 14 may be carried out by another computer that can be accessed via the communication network 20.

When the sound recognition unit 14 recognizes the trigger sound, the speech generation unit 17 of the user interface device 10a outputs a speech of the trigger word (for example, "XXX"). Also, when the sound recognition unit 14 specifies a piece of music, the speech generation unit 17 synthesizes and outputs a speech of a command phrase that designates playback of the piece of music (for example, "Play back YYY"). Specifically, the speech generation unit 17 may synthesize and output a speech of, for example, a text of the title of the piece of music outputted from the sound recognition unit 14, with a fixed phrase such as "play back". Such a fixed phrase may be synthesized each time, or a fixed phrase stored in advance may be read out. Thus, an entire speech command "XXX, play back YYY" is transmitted to the speech recognition system 30.

Figure 6:
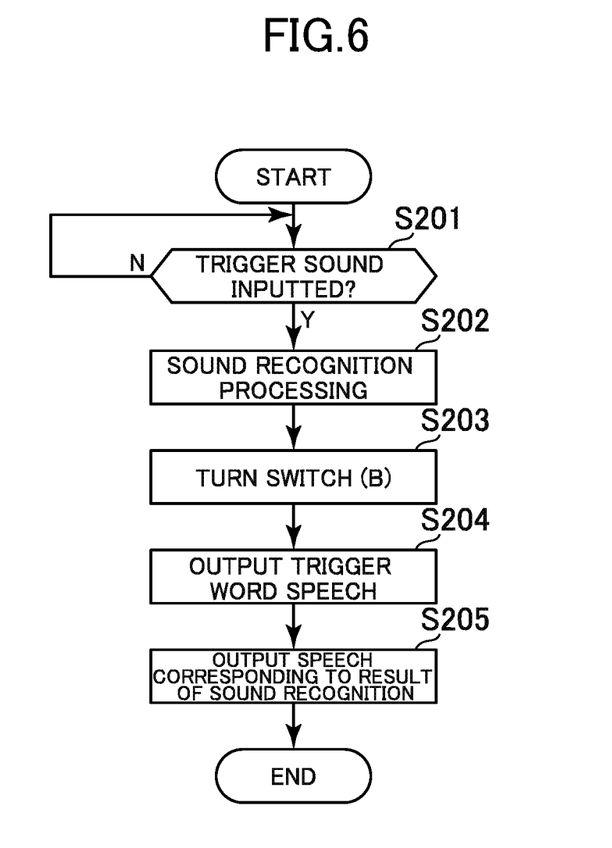
FIG. 6 is a flowchart showing the operation of the user interface device according to the second embodiment of the invention.

The control unit 15 of the user interface device 10a carries out the operation shown in FIG. 6. That is, as shown in FIG. 6, the control unit 15 waits until the sound recognition unit 14 determines that the trigger sound is collected (S201). If the trigger sound is collected, the control unit 15 then causes the sound recognition unit 14 to execute recognition processing on the sound collected by the microphone 11 (S202). Subsequently, the control unit 15 turns the switch 16 toward the speech generation unit 17 (B in the illustration) (S203) and transmits the speech of the trigger word outputted from the speech generation unit 17, to the speech recognition system 30 (S204). Next, the control unit 15 transmits the speech of the command phrase outputted from the speech generation unit 17, to the speech recognition system 30 (S205). The series of speeches is transmitted to the speech recognition system 30 in a single streaming session. Subsequently, the controllable device 60 receives a control command from the device control system 40 and carries out an operation corresponding to the control command, as described above.

With the second sound-enabled operation system described above, even if the user 50 utters nothing, the controllable device 60 can play back a desired piece of music. The command phrase is not limited to a phrase including information that univocally specifies a piece of music. For example, the sound recognition unit 14 may recognize musical attributes such as chord transition, rhythm, and tempo of the collected sound, and the speech generation unit 17 may output a speech of a command phrase including the recognized musical attributes. In this case, the device control system 40 may transmit, for example, a control command designating playback of a group of pieces of music having such musical attributes, to the controllable device 60. The command sound may be emitted from something other than the musical instrument 51. For example, a singing voice or humming of the user 50 may be used as the command sound. If a singing voice or humming of the user 50 is used as the command sound, the sound recognition unit 14 may recognize attributes such as age and gender of the user 50, and the speech generation unit 17 may include the content of the recognition in the speech of the command phrase. Thus, the device control system 40 can generate a control command designating an operation that matches the attributes of the user 50 (for example, playback of a piece of music which a young male may like), and can transmit the control command to the controllable device 60.

Figure 7:
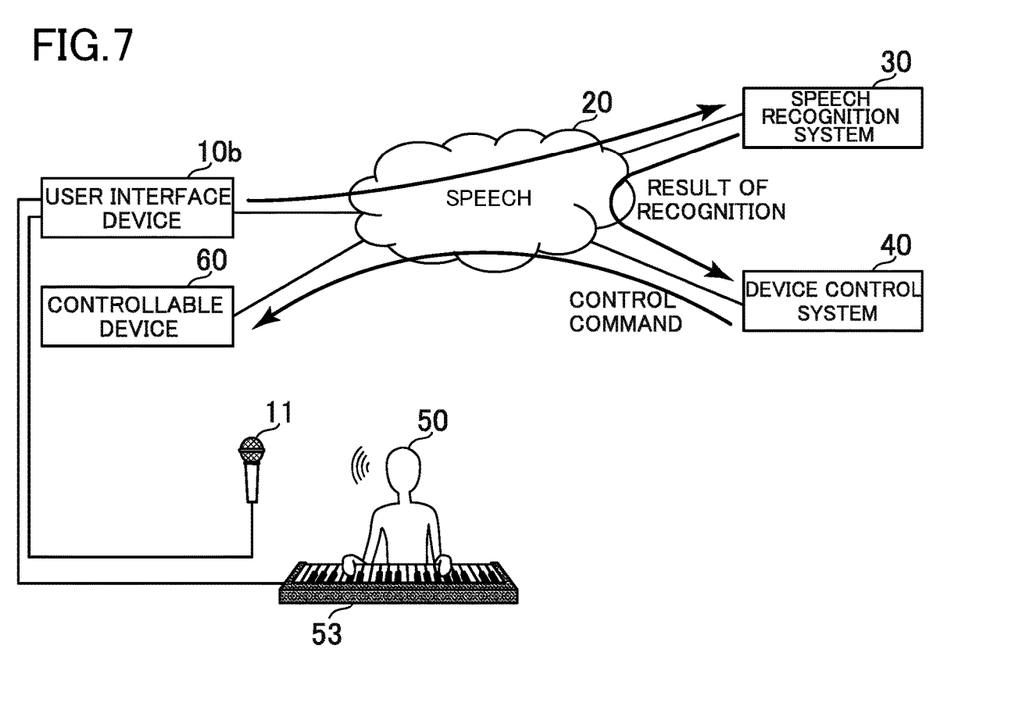
FIG. 7 shows the overall configuration of a third sound-enabled operation system including a user interface device according to a third embodiment of the invention.

Next, FIG. 7 shows the overall configuration of a third sound-enabled operation system. In the third sound-enabled operation system, a trigger sound and a part of a command sound are inputted from an electronic musical instrument 53 to a user interface device 10b according to a third embodiment of the invention via a line. The rest of the command sound is uttered by the user 50 and thus inputted from the microphone 11 to the user interface device 10b.

For example, the electronic musical instrument 53 is provided with a special button and can output a predetermined trigger sound via a line by having this button pressed. Of course, the user may play the electronic musical instrument 53 to output a predetermined chord or melody as a trigger sound via a line. To specify a piece of music, the user 50 plays a part of the piece of music with the electronic musical instrument 53 and thus inputs the musical sound to the user interface device 10b via a line. Meanwhile, to specify content of processing on the specified piece of music ("playback" or the like"), the user 50 inputs an utterance via the microphone. Thus, a speech of a trigger word generated by the speech generation unit 17 (for example, "XXX"), a speech of a command phrase specifying a piece of music (for example, "YYY") generated by the speech generation unit 17, and a speech by the user 50 representing content of processing on the piece of music (for example, "play back") are transmitted to the speech recognition system 30 from the user interface device 10b in a proper order.

Figure 8:
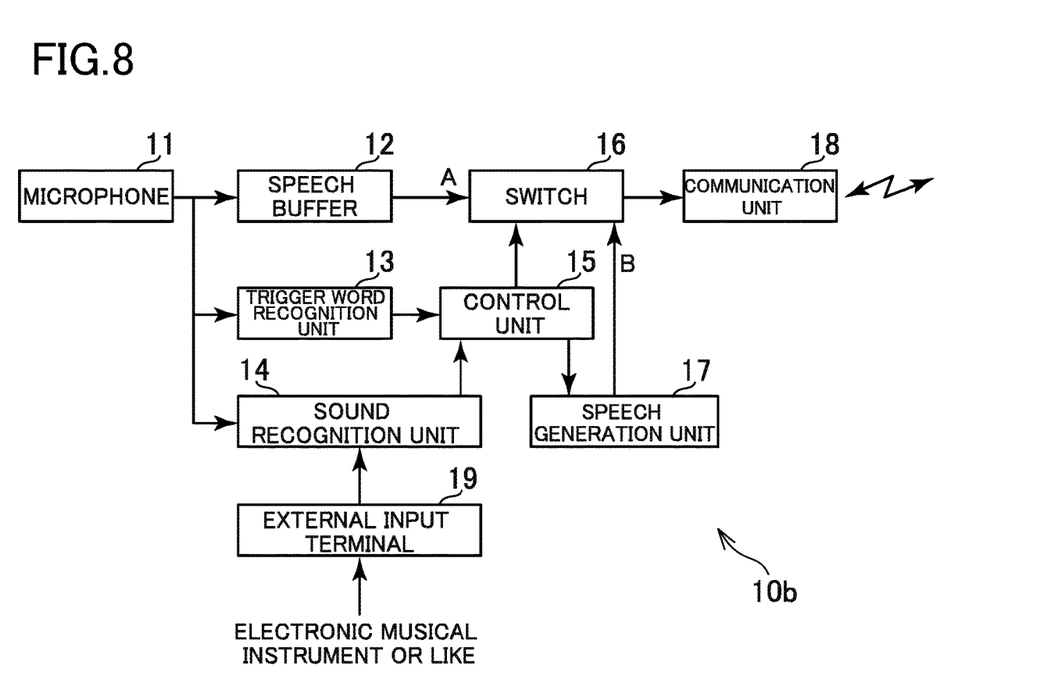
FIG. 8 shows the configuration of the user interface device according to the third embodiment of the invention.

The user interface device 10b has the configuration shown in FIG. 8. As shown in FIG. 8, in the user interface device 10b, the sound recognition unit 14 is provided with an external input terminal 19, to which the electronic musical instrument 53 such as an electronic keyboard is connected. The electronic musical instrument 53 may be wirelessly connected to the user interface device 10b. In any case, a trigger sound and a command sound in the form of electrical signals are inputted from the electronic musical instrument 53 to the user interface device 10b.

Figure 9:
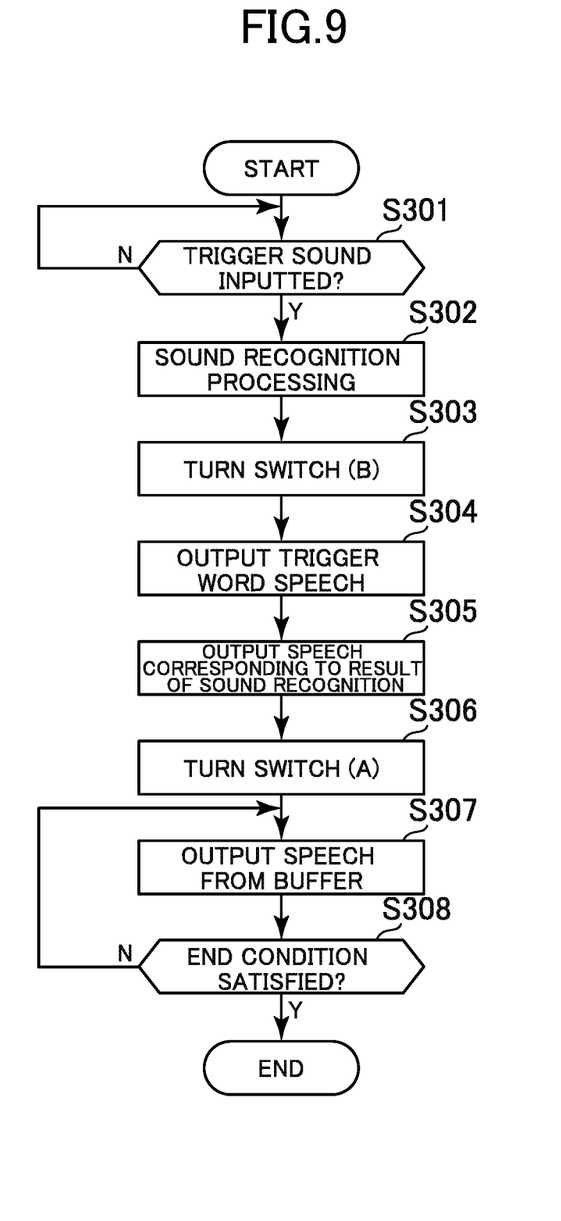
FIG. 9 is a flowchart showing the operation of the user interface device according to the third embodiment of the invention.

The control unit 15 of the user interface device 10b carries out the operation shown in FIG. 9. That is, as shown in FIG. 9, the control unit 15 waits until the sound recognition unit 14 determines that a trigger sound is inputted (S301). If the trigger sound is inputted, the control unit 15 then causes the sound recognition unit 14 to execute recognition processing on the sound inputted via a line (S302). Subsequently, the control unit 15 turns the switch 16 toward the speech generation unit 17 (B in the illustration) (S303) and transmits a speech of a trigger word generated from the speech generation unit 17, to the speech recognition system 30 (S304). Then, the control unit 15 transmits a speech of a command phrase outputted from the speech generation unit 17, to the speech recognition system 30 (S305).

Next, the control unit 15 turns the switch 16 toward the speech buffer 12 (A in the illustration) and causes the communication unit 18 to transmit a speech stored in the speech buffer 12 to the speech recognition system 30 (S307). Then, if a predetermined end condition is satisfied, for example, if a predetermined limit time has passed or if a silent state has continued for a predetermined time (S308), the control unit 15 stops the transmission of the speech to the speech recognition system 30. The series of speeches is transmitted to the speech recognition system 30 in a single streaming session. Subsequently, the controllable device 60 receives a control command from the device control system 40 and carries out an operation corresponding to the control command, as described above.

With the third sound-enabled operation system described above, a speech command can be inputted via a line. Therefore, the sound recognition unit 14 can carry out recognition processing without being affected by noises. Also, of the content of a command, a part that should be provided by playing a musical instrument can be provided by playing the electronic musical instrument 53, and a part that should be provided by utterance can be provided by utterance. This improves convenience. Also, the electronic musical instrument 53 may be integrated in the user interface device 10*b*. In this case, an acoustic signal generated from the functional part of the electronic musical instrument 53 is internally inputted to the functional part of the user interface device 10*b*.

Figure 10:
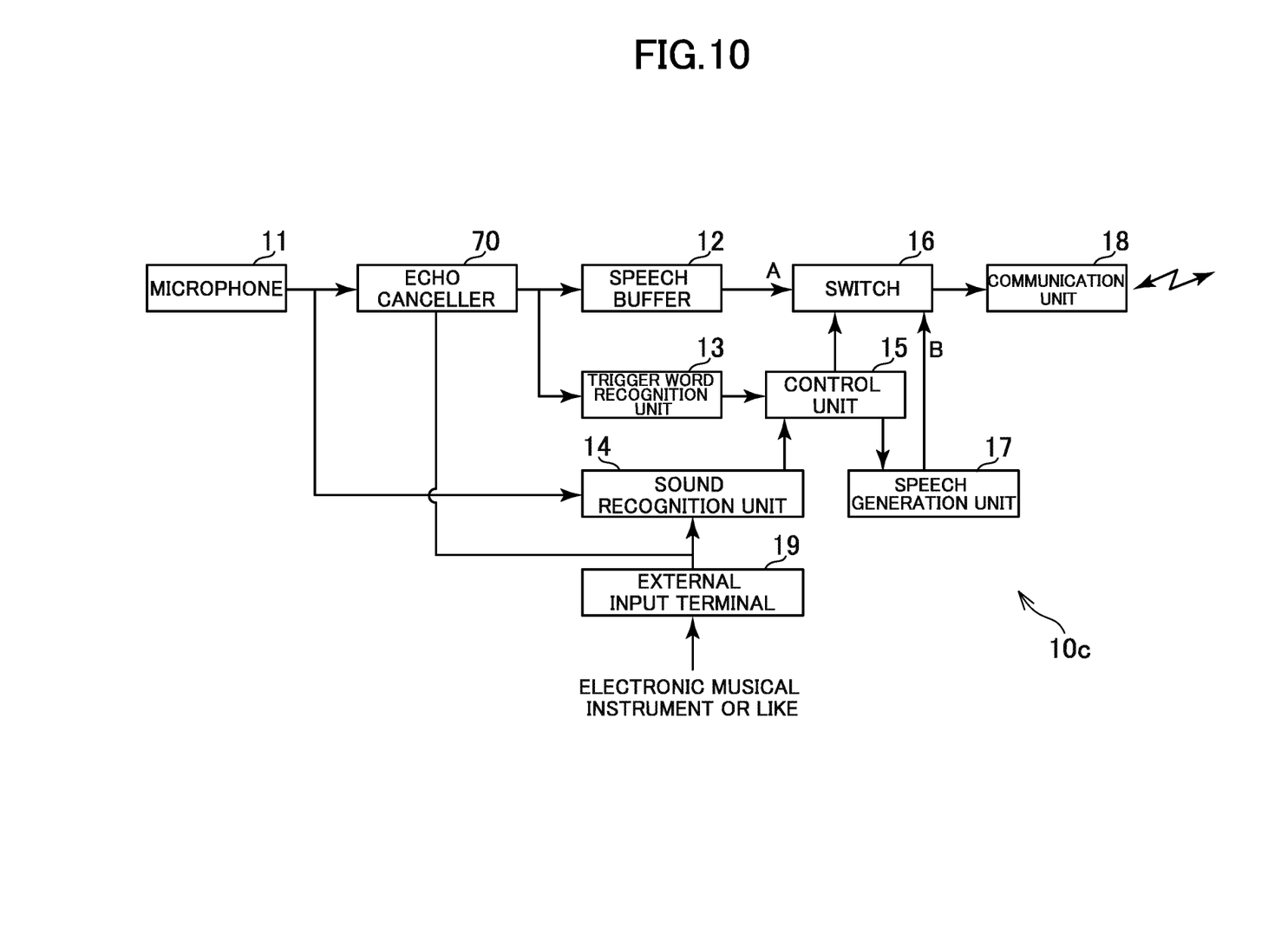
FIG. 10 shows a modification example of the user interface device according to the third embodiment of the invention.

If the electronic musical instrument 53 has a speaker, it may be envisaged that the microphone 11 collects a sound emitted from the speaker. Thus, as in a user interface device 10*c* shown in FIG. 10, an echo canceller 70 may be provided at a part preceding the speech buffer 12 and may be supplied with an input signal from the external input terminal 19. Thus, the echo canceller 70 can eliminate the sound of the input signal from the external input terminal 19, from the sound inputted from the microphone 11. This enables the voice of the user 50 to be transmitted to the speech recognition system 30 with the musical sound reduced and therefore enables improvement in the speech recognition rate of the speech recognition system 30.

Figure 11:
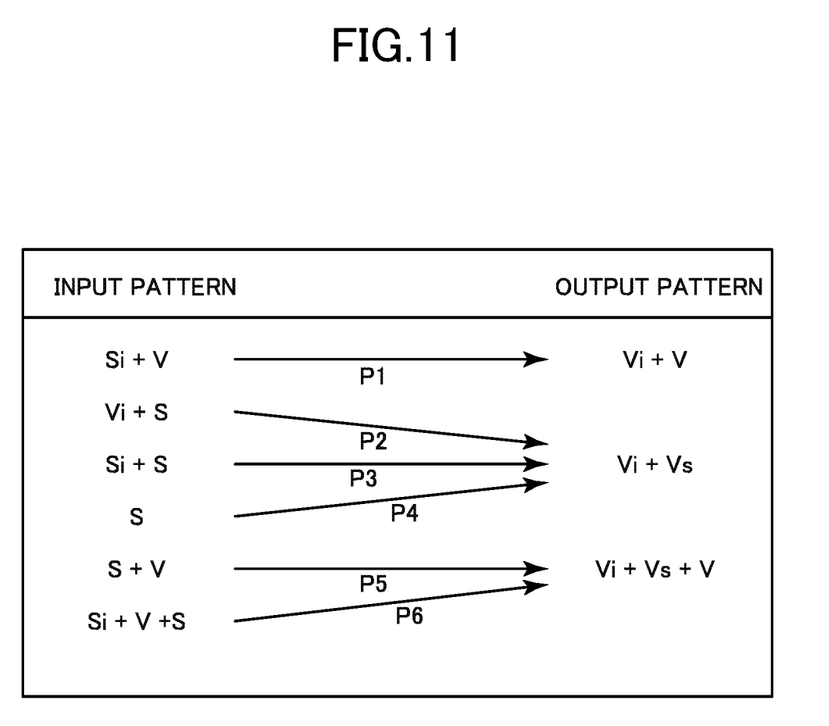
FIG. 11 shows various patterns of sound-enabled operation of the user interface device according to the invention.

In the embodiments, the speech recognition system 30 converts an input sound into an acceptable speech so that the controllable device 60 can be operated from the user interface device 10, 10*a*, 10*b* with a sound that is unacceptable to the speech recognition system 30, such as a musical sound. The conversion includes various patterns. FIG. 11 shows some of such patterns. In FIG. 11, Si represents a trigger sound inputted from the musical instrument 51 or the like. V represents a speech of a command phrase given by the user 50. S represents a command sound inputted from the musical instrument 51 or the like. Vi represents a speech of a trigger word. Vs represents a speech of a command phrase (hereinafter referred to as "synthetic command phrase speech") generated by the electronic musical instrument 53 or the like, based on a command sound inputted from the musical instrument 51 or the like.

First, an input pattern "Si+V" is to input a trigger sound and a speech of a command phrase (in any order; the same applies to the subsequent input patterns as well). The input pattern "Si+V" is converted to an output pattern "Vi+V", which is to output a speech of a trigger word and a speech of a command phrase in order (pattern P1). An input pattern "Vi+S" is to input a speech of a trigger word and a command sound. The input pattern "Vi+S" is converted to an output pattern "Vi+Vs", which is to output a speech of a trigger word and a synthetic command phrase speech in order (pattern P2). An input pattern "Si+S" is to input a trigger sound and a command sound. The input pattern "Si+S", too, is converted to an output pattern "Vi+Vs" (pattern P3). An input pattern "S" is an input of a command sound which also serves as a trigger sound. The input pattern "S", too, is converted to an output pattern "Vi+Vs" (pattern P4). An input pattern "S+V" is to input a command sound which also serves as a trigger sound, and a speech of a command phrase. The input pattern "S+V" is converted to an output pattern "Vi+Vs+V", which is to output a speech of a trigger word, a synthetic command phrase speech, and a speech of a command phrase in order (pattern P5). An input pattern "Si+V+S" is to input a trigger sound, a speech of a command phrase, and a command sound. The input pattern "Si+V+S", too, is converted to an output pattern "Vi+Vs+V" (pattern P6).

In the sound-enabled operation system, any of the conversion patterns P1 to P6 may be carried out. In any output pattern, the speech of the trigger word (Vi) may be omitted if it is not regarded as essential by the speech recognition system 30.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A user interface device comprising:
a sound collecting device that collects sound and outputs a sound signal representative of the collected sound;
a processor that performs a plurality of tasks, including:
a sound recognition task that performs a predetermined recognition processing on the sound signal to determine whether the sound signal includes a predetermined sound; and
a speech generation task that generates a speech including a command word upon the sound recognition task determining that the sound signal includes the predetermined sound; and
a communication interface that outputs the speech generated by the speech generation task.

2. The user interface device according to claim 1, wherein the communication interface transmits the speech generated by the speech generation task to a speech recognition system.

3. The user interface device according to claim 2, wherein a controllable device is controlled, based on a result of recognition by the speech recognition system of the speech generated by the speech generation task.

4. The user interface device according to claim 1, wherein the sound collecting device comprises a microphone.

5. The user interface device according to claim 1, wherein the predetermined sound is a trigger sound other than a speech.

6. The user interface device according to claim 5, wherein the trigger sound is an inaudible sound formed by encoding predetermined data.

7. The user interface device according to claim 1, wherein the communication interface transmits the sound signal to an external sound recognition system.

8. The user interface device according to claim 1, wherein the communication interface transmits the speech generated by the speech generation task and part of the sound signal, in a predetermined order.

9. A user interface method comprising:
acquiring an input sound and outputting a sound signal representative of the input sound;
performing a predetermined recognition processing on the sound signal to determine whether the sound signal includes a predetermined sound;
generating a speech including a command word upon the performing of the recognition processing determines that the sound signal includes a predetermined sound; and
outputting the generated speech.

10. The user interface method according to claim 9, wherein the outputting of the speech includes transmitting the speech to a speech recognition system.

11. The user interface method according to claim 10, wherein the speech recognition system controls a controllable device, based on of the output generated speech.

12. The user interface method according to claim 9, wherein the acquiring of the input sound acquires the input sound via a microphone or via an input of an electrical signal.

13. The user interface method according to claim 9, wherein the predetermined sound is a trigger sound other than a speech.

14. The user interface method according to claim 13, wherein the trigger sound is an inaudible sound formed by encoding predetermined data.

15. The user interface method according to claim 9, wherein the outputting of the generated speech includes transmitting the generated speech to an external sound recognition system.

16. The user interface method according to claim 9, wherein the outputting of the speech includes outputting the generated speech and part of the sound signal, in a predetermined order.

17. A user interface method comprising:

acquiring an input sound and outputting a sound signal representative of the input sound;

performing a predetermined recognition processing on the sound signal to determine whether the sound signal includes a predetermined sound;

generating a speech including a command word upon the performing of the recognition processing determines that the sound signal includes a predetermined sound;

outputting the generated speech; and controlling a device according to the output generated speech by a speech recognition system.

* * * * *